(12) United States Patent
Redfern

(10) Patent No.: US 7,333,535 B2
(45) Date of Patent: Feb. 19, 2008

(54) VARIABLE BLOCK RATE ADSL

(75) Inventor: Arthur John Redfern, Plano, TX (US)

(73) Assignee: Texas Instruments Incorporated, Dallas, TX (US)

( * ) Notice: Subject to any disclaimer, the term of this patent is extended or adjusted under 35 U.S.C. 154(b) by 696 days.

(21) Appl. No.: 10/293,691

(22) Filed: Nov. 13, 2002

(65) Prior Publication Data

US 2003/0118090 A1    Jun. 26, 2003

Related U.S. Application Data

(60) Provisional application No. 60/341,263, filed on Dec. 20, 2001.

(51) Int. Cl.
*H04B 17/00* (2006.01)
(52) U.S. Cl. .................. 375/225; 375/220; 375/227
(58) Field of Classification Search ............. 375/222, 375/224, 225, 260, 261, 219, 295, 298, 316, 375/356, 206; 370/465, 468, 252; 455/69
See application file for complete search history.

(56) References Cited

U.S. PATENT DOCUMENTS

| | | | | |
|---|---|---|---|---|
| 5,675,572 A | * | 10/1997 | Hidejima et al. | 370/206 |
| 5,999,563 A | * | 12/1999 | Polley et al. | 375/222 |
| 6,246,694 B1 | * | 6/2001 | Chen | 370/468 |
| 6,498,808 B1 | * | 12/2002 | Tzannes | 375/225 |
| 6,507,606 B2 | * | 1/2003 | Shenoi et al. | 375/211 |
| 6,751,444 B1 | * | 6/2004 | Meiyappan | 455/69 |
| 6,922,397 B1 | * | 7/2005 | Chen | 370/252 |
| 2001/0033612 A1 | * | 10/2001 | Peeters | 375/222 |
| 2002/0118766 A1 | * | 8/2002 | Mitlin et al. | 375/261 |

* cited by examiner

*Primary Examiner*—Khanh C. Tran
(74) *Attorney, Agent, or Firm*—Wade James Brady, III; Frederick J. Telecky, Jr.

(57) ABSTRACT

By allowing the block rate to vary, the existing Asymmetric Digital Subscriber Line (ADSL) system is modified to better address extended reach and higher data rates. A method is disclosed for providing improved reach from the ADSL standard by reducing the block rate from the ADSL standard and providing improved data rate for short loops by increasing the block rate from the ADSL standard.

21 Claims, 3 Drawing Sheets

---

INDICATE CAPABILITIES
--ALLOWED DATA RATES AND BLOCK RATES
--SUPPORTED BLOCK RATES
--MODEM CAPABILITIES (e.g., ECHO CANCELLATION, CODING)

↓

PROBE CHANNEL
--SINGLE ENDED TEST
--DUAL ENDED TEST

↓

DETERMINE BLOCK RATE
--OPTIMIZE BASED ON CAPABILITIES AND CHANNEL PROBE
--NEGOTIATE FINAL VALUE BETWEEN SERVICE PROVIDER AND CONSUMER EQUIPMENT

↓

TRAIN AND OPERATE AT NEGOTIATED BLOCK RATE

VARIABLE BLOCK RATE ADSL

This application claims priority under 35 USC § 119(e)(1) of provisional application No. 60/341,263 filed Dec. 20, 2001.

FIELD OF INVENTION

This invention relates digital communications and more particularly to varying the block rate or the frequency at which a discrete multitone (DMT) frame is transmitted in an asymmetric digital subscriber line (ADSL) modem.

BACKGROUND OF INVENTION

Digital subscriber line (DSL) technologies are a family of high-speed network access technologies using ordinary telephone lines, with ADSL being an example of these technologies. ADSL is characterized by allowing a different downstream data rate from the service provider such as the telephone company to the consumer premises as compared to the upstream data rate from the customer premises to the service provider. The ADSL standard is described in S. Palm (ed.), "Asymmetrical Digital Subscriber Line (ADSL) Transceivers," ITU-T Q4/SG15, G.992.1, 1999. This reference is incorporated herein by reference.

There are two primary benefits of DMT modulation on which ADSL is built. The first is the ability to do simplified equalization when the time span of the channel impulse response is shorter than the length of the cyclic prefix. The second is the ability to optimize the bit and gain allocation to maximize capacity.

Service providers are anxious to both increase their coverage area and offer higher data rates. Thus it is highly desirable to provide increased reach for long loops and increased rate for short loops. There is nothing in the ADSL standard which address these issues in a meaningful way.

SUMMARY OF INVENTION

In accordance with one embodiment of the present invention, by adjusting the block rate (the frequency at which the a DMT frame is transmitted which is equivalent to the sampling frequency divided by the number of subchannels plus the cyclic prefix we are able to provide a system with improved reach for longer loops or higher rates for shorter loops.

DESCRIPTION OF PREFERRED EMBODIMENTS OF THE PRESENT INVENTION

Figure 1:
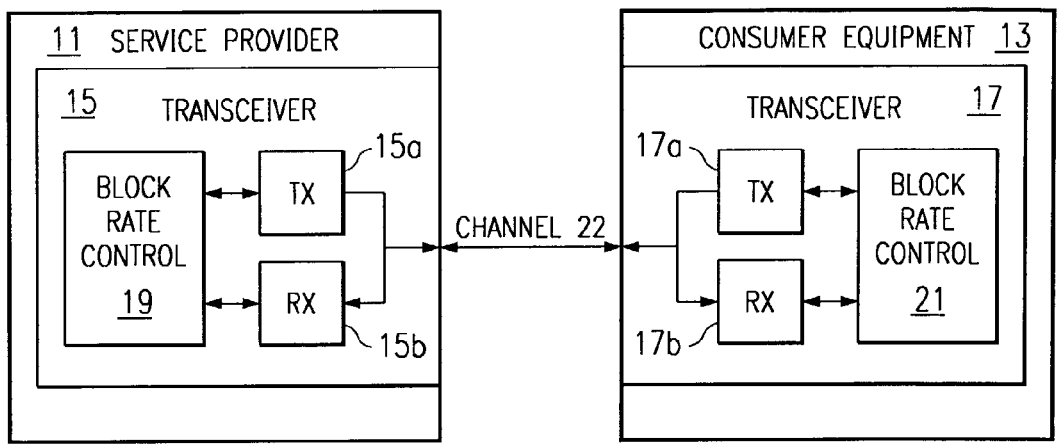
FIG. 1 illustrates the system according to one embodiment of the present invention.

A service provider 11 includes a transceiver (modem) 15 that transmits via transmitter 15a discrete multitone (DMT) frames to consumer equipment 13 that includes a transceiver (modem) 17 that receives the frames at receiver 17b. Additionally, the consumer equipment transceiver 17 transmits via transmitter 17a DMT frames to service provider transceiver 15 that receives the frames at receiver 15b. The frames are transmitted over a channel such as a twisted pair wire 22. The frame may contain data, control commands, and various other types of information.

In accordance with one embodiment of the present invention the coverage area of ADSL is increased by reducing the block or frame rate where said block rate is equivalent to the sampling frequency divided by the number of subchannels plus the cyclic prefix length. A control signal generated at control 1 and 21 is applied to both of the transceivers to reduce the frame rate. At both transceivers 15 and 17 the block or frame rate is reduced.

In accordance with a second embodiment of the present invention for short loops higher data rates are achieved using a higher block or frame rate where said block rate is equivalent to the sampling frequency divided by the number of subchannels plus the cyclic prefix length. A control signal generated at control 19 and 21 is applied to both of the transceivers to increase the frame rate. At both transceivers 15 and 17 the block or frame rate is increased.

Figure 2:
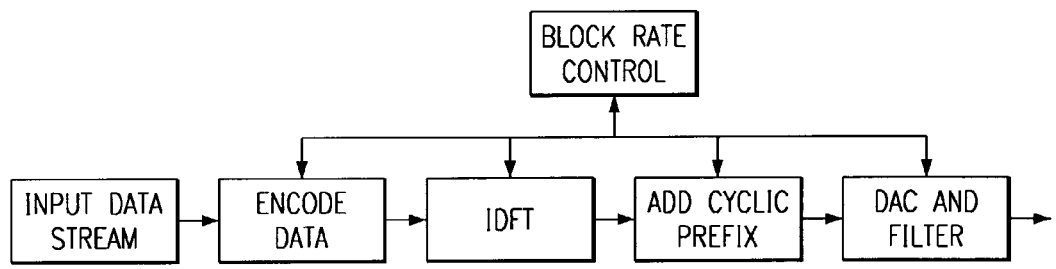
FIG. 2 illustrates a typical ADSL transmitter and a frame rate control according to an embodiment of the present invention.
Figure 3:
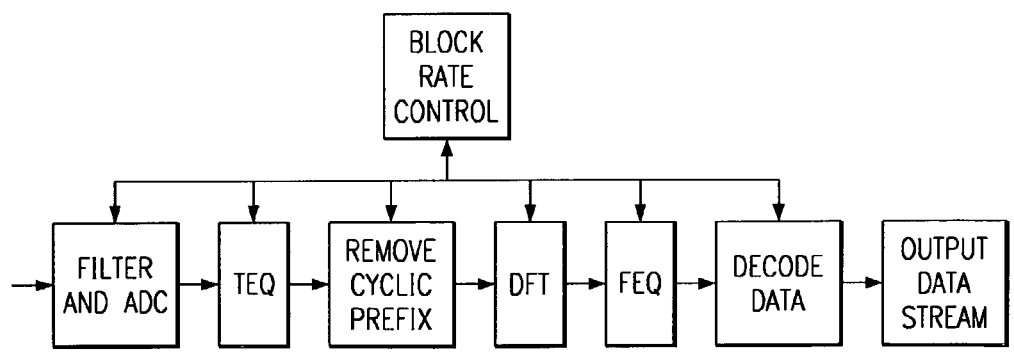
FIG. 3 illustrates a typical ADSL receiver and a frame rate control according to one embodiment of the present invention.

FIG. 2 illustrates a typical ADSL transmitter modified with variable frame rate control and FIG. 3 illustrates an ADSL receiver with variable frame rate control. In the transmitter the input data signal is segmented into frames or blocks and encoded onto subchannels. DMT modulation of the encoded information is performed using a size N inverse discrete Fourier transform (IDFT). A cyclic prefix is prepended to the modulated data, and filtering and digital to analog conversion is performed. The cyclic prefix is simply the last L samples of the N sample DMT symbol, resulting in a symbol of length N+L samples after the addition of the cyclic prefix.

At the receiver the signal is filtered and analog to digital converted. The digital signal is then possibly equalized with a time-domain equalizer (TEQ). After equalization, the cyclic prefix is removed and the signal is DMT demodulated using the discrete Fourier transform (DFT). If the channel is sufficiently shortened, then the transmitted data can be recovered by applying a frequency-domain equalizer (FEQ) to the demodulated signal and decoding the result.

At both the transmitter and the receiver, the frequency of the DMT frames (which determines the frequency that the encode data, IDFT, add cyclic prefix, DAC and filter, filter and DAC, TEQ, remove cyclic prefix, DFT, FEQ, and decode data blocks operate at) is determined by a control block at the transmitter and receiver.

Theoretical justification and supporting simulation results illustrate that allowing an ADSL system to vary it's block rate naturally lends itself to equalization and bit loading that matches the channel length and data rate expectations. It is reasonable to expect that the proposed solutions for extended reach or increased rate could be implemented on the same integrated circuit chip as a standard ADSL solution as illustrated by the use of a typical ADSL transmitter and receiver in FIGS. 2 and 3.

Extended Reach

By reducing the block rate of a DMT system, the bandwidth the system uses is effectively reduced. The same effect can be achieved by turning off subchannels. However, the important difference is that by reducing the block rate the length of the cyclic prefix is effectively increased in time by the same factor.

Figure 4:
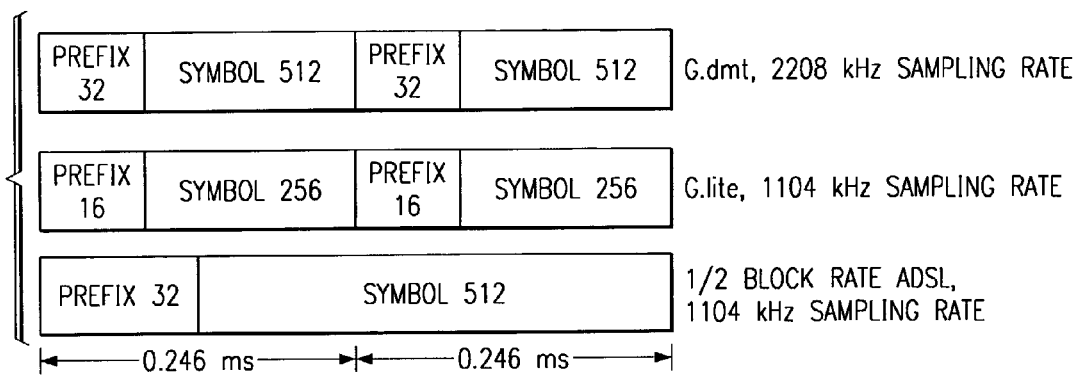
FIG. 4 illustrates frame structure of a G.dmt (256 subchannel ADSL), G.Lite (128 subchannel ADSL), and ½ block rate ADSL frames.

Increasing the length of the cyclic prefix in time allows more of the longer channels (which also have longer impulse responses) to fit within the cyclic prefix. According to past experiences with channel shortening it has been observed that it is difficult to design good channel shortening filters (TEQs) for a variety of cases. By allowing more of the channel to fit within the cyclic prefix this problem is effectively sidestepped. Additionally, the ratio of the length of the cyclic prefix to the length of the information stays the same so there is no increase in the amount of redundancy needed for simplified equalization. This can be seen in FIG. 4, which compares the frame structure of a G.dmt (256 subchannel ADSL), G.lite (128 subchannel ADSL), and ½ block rate ADSL frames. The redundancy, the ratio of the cyclic prefix length to IDFT length, is the same for all three cases. However, the prefix length (in time) of ½ block rate ADSL is twice that of the G.dmt or G.lite.

At longer loop lengths such as 20-25 kft of 26 American wire gauge (AWG), it is not a concern that the reduced block rate system uses less bandwidth, as the capacity of the bandwidth that is not used is very small. In fact, another key to extending reach is to allow the downstream to use more of the lower frequencies, as they are less attenuated at longer loops. This is also achieved by reducing the block rate.

As an example, to extend the reach of the existing ADSL system, the block rate is reduced by a factor of 8 using the controls 19 and 21. This results in a block rate (and carrier spacing) of 4312.5/8=539 Hz. The number of downstream subchannels can remain the same as normal ADSL (256 unique+256 conjugate symmetric), but it is more convenient to use 64 subchannels in the upstream. 64 subchannel transmitters are also common in ADSL. It is important to note that other choices of the fraction to reduce the block rate by are possible (e.g., ½, ¼, etc.).

Table 1 summarizes the various parameters that are used in this example to achieve extended reach.

TABLE 1

Example variable block rate ADSL parameters used to achieve extended reach.

| Parameter | Value |
|---|---|
| Block rate (Hz) | 4312.5/8 = 539 |
| Upstream subchannels | 64 |
| Upstream loaded subchannels | 40-63 |
| Upstream transmit PSD (dBm/Hz) | −38 |
| Downstream subchannels | 256 |
| Downstream loaded subchannels | 71-255 |
| Downstream transmit PSD (dBm/Hz) | −40 |
| Margin (dB) | 6 |
| Coding gain (dB) | 5 or 6 |
| Fine gain boost (dB) | 0.7 |
| AWGN PSD (dBm/Hz) | −140 |

Generally, in order for an operator to deploy a new DSL system, it needs to be shown that the new system will not overly degrade the performance of existing systems. This simplifies the deployment of the new system for the operator. For North America, the T1E1 standards committee has developed a spectral management document to address this issue. The document provides two methods with which to show that the system is spectrally compatible with existing systems. In the first method (Method A) the new system needs to be shown that it satisfies the existing Power Spectral Density (PSD), balance and power requirements of an existing system. In the second method (Method B) the new system needs to be shown (analytically) not to degrade the performance of existing systems within some protected ranges and limits.

The variable block rate system described in Table 1 satisfies the spectral compatibility requirements by Method A (using either the SM3 or SM5 classes). In fact, it may be possible to further increase the proposed transmit PSDs and still remain under the SM3 mask.

A beneficial aspect of simply decreasing the block rate is that a majority of the digital components already implemented for standard ADSL transceiver can be directly applied to the reduced block rate mode of operation. In almost all cases, the digital logic remains the same, only it is used a fraction as often.

The analog portion of the circuitry is where more changes would be required. For example, an extra analog filtering options would be necessary to add the extended reach to an existing analog front end (AFE).

Figure 5A:
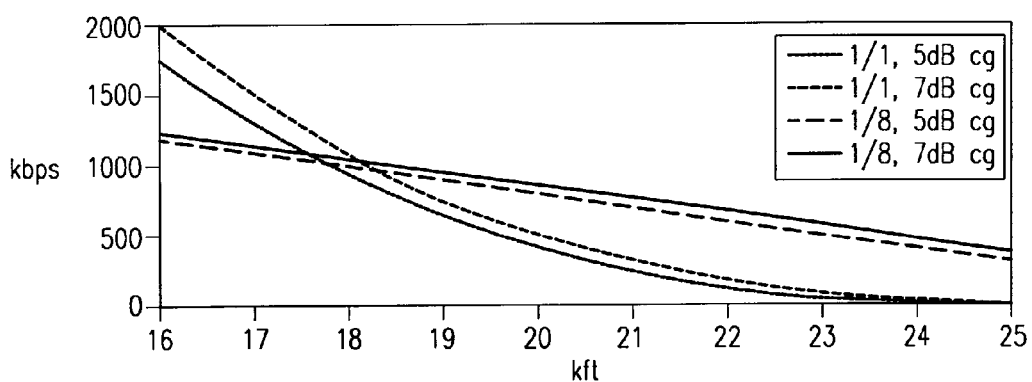
FIG. 5 illustrates rate vs. reach plots for standard ADSL and the ⅛ block rate extended reach ADSL system for 5 and 7 dB coding gains wherein FIG. 5A plots downstream rate vs. reach and FIG. 5B plots upstream vs. reach.
Figure 5B:
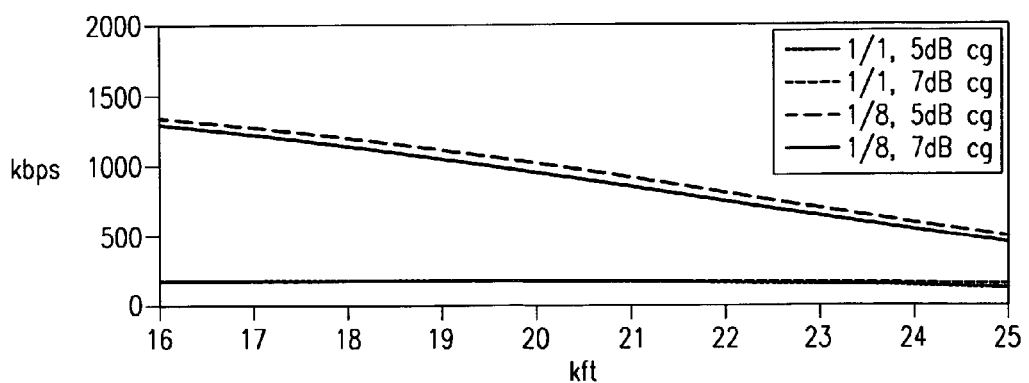

FIGS. 5A and 5B illustrate the achievable data rates for the system specified in Table 1 with a coding gain of 5 dB (perhaps slightly optimistic for RS+trellis) and 7 dB (implying the use of turbo or LDPC codes+RS). For comparison purposes, achievable data rates for standard ADSL system are also plotted with the same two coding gains. Note that all of the simulations assume perfect channel shortening. However, this is a more optimistic assumption for the standard ADSL system, since the extended reach ADSL system's prefix is 8× longer (in time) in this example.

From FIG. 5A it is illustrated that the extended reach system provides benefits to downstream performance starting from around 18 kft. At a loop length of 25 kft, a rate of about 384 kbps (kilobits per second) may be achievable in a practical system (this allows for some implementation loss relative to these idealized simulations).

Increased Rate

By increasing the block rate of a DMT system, the bandwidth that the system uses is effectively expanded. As the block rate increases, the length of the cyclic prefix in time decreases by the same factor. This is reasonable, however, since for the shorter channel lengths where it makes sense to expand the bandwidth the length of the channel tends to be shorter. Note that the ratio of the length of the cyclic prefix to the length of the information stays the same, so the amount of redundancy needed for the prefix does not increase.

As an example, to increase the achievable data rate of the existing ADSL system for shorter loops, the block rate is increased by a factor of 2 using controls 19 and 21 in FIG. 1. This results in a block rate (and carrier spacing) of 4312.5*2=8625 Hz. The number of downstream and upstream subchannels can remain the same as in normal ADSL (256 and 32 respectively). It is important to note that other choices of the multiple to increase the block rate by are possible (e.g., 4, 8, etc.).

Table 2 summarizes the various parameters that are used in this example to achieve increased rates.

TABLE 2

Example variable block rate ADSL parameters used to achieve increased rate.

| Parameter | Value |
|---|---|
| Block rate (Hz) | 4312.5*2 = 8625 |
| Upstream subchannels | 32 |
| Upstream loaded subchannels | 4-15 |
| Upstream transmit PSD (dBm/Hz) | −38 |
| Downstream subchannels | 256 |
| Downstream loaded subchannels | 19-255 |
| Downstream transmit PSD (dB/Hz) | −60 |
| Margin (dB) | 6 |
| Coding gain (dB) | 5 or 7 |
| Fine gain boost (dB) | 0.7 |
| AWGN PSD (dBm/Hz) | −140 |

The variable block rate system proposed in Table 2 can use the same PSD masks as VDSL to maintain spectral compatibility.

A beneficial aspect of simply increasing the block rate is that a majority of the digital components already implemented for standard ADSL transceiver can be directly applied to the reduced block rate mode of operation. In almost all cases, the digital logic remains the same, only it is more often (e.g., twice as often in the preceding example). One option on the service provider side where there is a large number of channels running on the same chip would be to reduce the number of supported modems and use the additional computational time slots.

Figure 6:
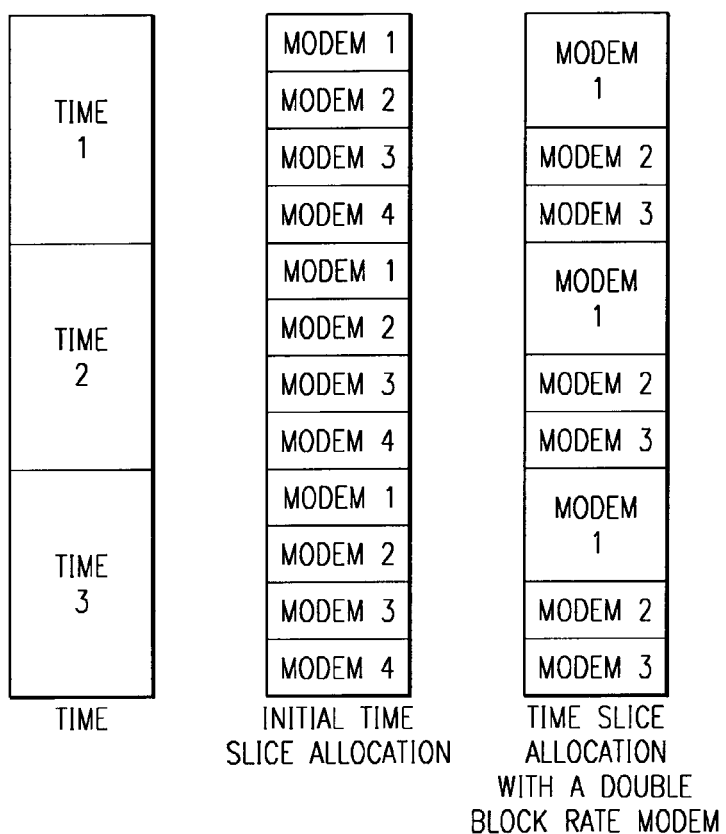
FIG. 6 illustrates the case where there are four modems operating at an initial block rate and sharing resources, and three modems, one operating at double the block rate, sharing resources.

FIG. 6 illustrates the case where there are four modems operating at an initial block rate and sharing resources. Each unit of time is broken into four slices, with one slice allocated to each modem. If the block rate in one of the modems is increased by two, then the number of supported modems reduces by one, as the higher block rate modem needs two time slices to complete its resulting computations.

The analog portion of the circuitry is where more changes would be required. For example, an extra analog filtering options would be necessary to add the increased rate to an existing analog front end (AFE).

Determining the Block Rate

By appropriately selecting the DMT block rate, ADSL systems can be modified to better address extended reach and higher rate channels.

Figure 7:
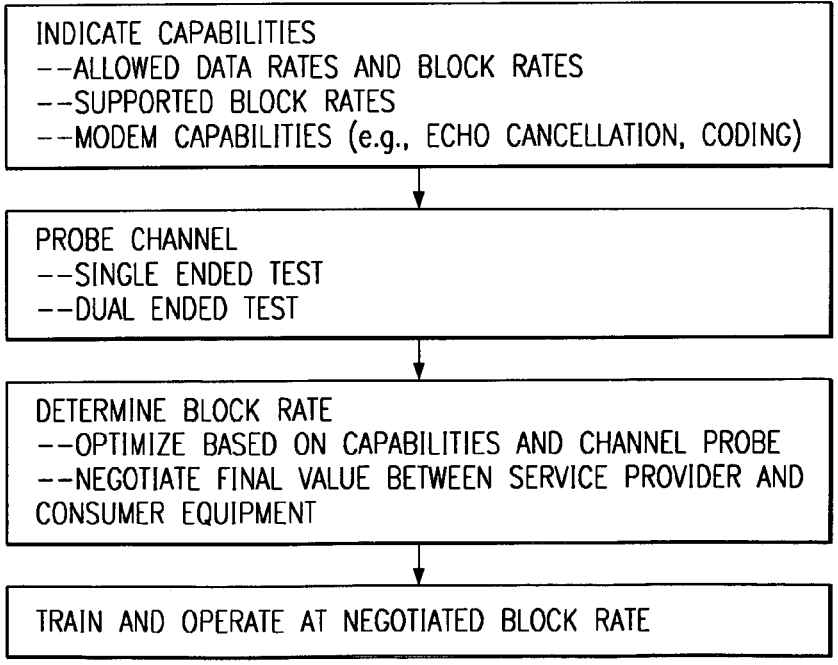
FIG. 7 is a flow diagram illustrating the block rate negotiation process and subsequent modem operation.

In accordance with an embodiment of the present invention the setting at controls 19 and 21 may be negotiated during an initial handshake or channel discovery portion of training. The capabilities of each transceiver can be provided by communicating the allowed data and rates, communicating the supported block rates and communicating the modem capabilities between the transceivers. For example, the controls could be set according to the flow diagram in FIG. 7, where the service provider and consumer equipment communicate their capabilities (possibly based on the specific rates the consumer equipment is authorized to receive), probe the channel, negotiate the optimal block rate (based on capabilities and the channel), and train with the selected block rate. The probing channel step can be single ended channel testing (service provider transceiver or customer equipment end testing) or dual ended channel testing (service provider and customer equipment end testing).

In accordance with one embodiment of the present invention the multicarrier modulation includes operations implemented using programmable logic; and the same programmable logic used at a slower speed when the block rate is reduced.

Although preferred embodiments have been depicted and described herein, it will be apparent to those skilled in the relevant art that various modifications additions, substitutions and the like can be made without departing from the spirit of the invention and these are therefore considered to be within the scope of the invention as defined in the following claims.

The invention claimed is:

1. A method of providing for multicarrier modulation one of improved reach or data rate characteristics between a service provider and consumer equipment transceiver comprising the steps of:
   providing the capabilities of each transceiver;
   probing the channel for determining channel conditions;
   determining a block rate for multicarrier modulation for one of improved reach or data rate characteristics between a service provider and consumer equipment transceiver for the determined channel conditions where said block rate is equivalent to a sampling frequency divided by {a number of subchannels plus a cyclic prefix length}; and
   training and operating the transceivers at the said block rate.

2. The method of claim 1, wherein the providing step comprises:
   communicating allowed data and block rates;
   communicating supported block rates; and
   communicating transceiver capabilities.

3. The method of claim 1, wherein the probing step includes single ended channel testing.

4. The method of claim 1, wherein the probing step includes dual ended channel testing.

5. The method of claim 1, wherein the determining step comprises:
   optimizing the block rate based on the transceiver capabilities and channel probe; and
   negotiating a final block rate between the service provider and consumer equipment.

6. The method of claim 1, wherein the multicarrier modulation is based on the Inverse Discrete Fourier Transform (IDFT) and Discrete Fourier Transform (DFT).

7. The method of claim 1, wherein the block rate is reduced to improve the reach of the system.

8. The method of claim 7, wherein there is an initial system block rate and the block rate is then reduced by the largest integer fraction such that the resulting system bandwidth is greater than the optimum transmit bandwidth.

9. The method of claim 8 wherein the initial system block rate is the ADSL block rate.

10. The method of claim 1, wherein the block rate is increased to improve the data rate characteristics of the system.

11. The method of claim 10, wherein there is an initial system block rate and the block rate is then increased by the smallest integer multiple such that the resulting system bandwidth is greater than the optimum transmit bandwidth.

12. The method of claim 11, wherein the initial system block rate is the ADSL block rate.

13. A method of providing for multicarrier modulation improved data rate characteristics between a service provider transceiver and consumer equipment transceiver wherein there are hardware resources which are shared by more than one transceiver and there is a maximum number of transceivers sharing said hardware resources which can operate at the same time at an said block rate is equivalent to a sampling frequency divided by {a number of subchannels plus a cyclic prefix length} comprising the steps of:

provinding the capabilities of each transceiver;

probing the channel;

determining an improved block rate for improved data rate characteristics equivalent to the sampling frequency divided by the number of subchannels plus the cyclic prefix length for multicarrier modulation;

training and operating the transceivers at the said improved block rate; and allocating the hardware resources such that for each transceiver in which the improved block rate is increased by an integer multiple relative to said initial system block rate, the maximum number of transceivers supported by said hardware resources at the initial block rate is reduced by said integer minus one.

14. The method of claim 13, wherein the multicarrier modulation step includes: operations implemented using programmable logic; and the same programmable logic used at a slower speed when the block rate is reduced.

15. A method of providing for multicarrier modulation for one of improved reach or data rate characteristics between a service provider transceiver and consumer equipment transceiver comprising the steps of:

determining block rate for multicarrier modulation for said one of improved reach or data rate characteristics for determined channel conditions wherein said block rate is equivalent to a sampling frequency divided by {a number of subchannels plus a cyclic prefix length}; and training and operating the transceivers at the said block rate.

16. The method of claim 15, wherein the block rate is reduced to improve the reach of the system.

17. The method of claim 16, wherein there is an initial system block rate and the block rate is then reduced by the largest integer function such that the resulting system bandwidth is greater than the optimum transmit bandwidth.

18. The method of claim 17, wherein the initial system block rate is the ADSL block rate.

19. The method of claim 15, wherein the block rate is increased to improve the data rate characteristics of the system.

20. The method of claim 19, wherein there is an initial system block rate and the block rate is then increased by the smallest integer multiple such that the resulting system bandwidth is greater than the optimum transmit bandwidth.

21. The method of claim 20, wherein the initial system block rate is the ADSL block rate.

* * * * *